United States Patent
Yamashita et al.

(10) Patent No.: US 9,498,976 B2
(45) Date of Patent: Nov. 22, 2016

(54) ULTRAVIOLET-CURABLE AQUEOUS INK, INK CARTRIDGE, RECORDING APPARATUS AND RECORDING METHOD

(71) Applicant: FUJI XEROX CO., LTD., Tokyo (JP)

(72) Inventors: Yoshiro Yamashita, Kanagawa (JP); Hiroyuki Ueki, Kanagawa (JP); Mami Hatanaka, Kanagawa (JP); Daisuke Nakashima, Kanagawa (JP); Toshitake Yui, Kanagawa (JP); Naoki Morita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 204 days.

(21) Appl. No.: 14/103,890

(22) Filed: Dec. 12, 2013

(65) Prior Publication Data

US 2014/0362150 A1 Dec. 11, 2014

(30) Foreign Application Priority Data

Jun. 7, 2013 (JP) .................................. 2013-120861

(51) Int. Cl.
*B41J 11/00* (2006.01)
*B41M 7/00* (2006.01)
*C09D 11/101* (2014.01)
*C09D 11/322* (2014.01)

(52) U.S. Cl.
CPC ........... *B41J 11/002* (2013.01); *B41M 7/0081* (2013.01); *C09D 11/101* (2013.01); *C09D 11/322* (2013.01)

(58) Field of Classification Search
CPC ...... B41J 2/17503; B41J 2/2107; B41J 2/01; B41J 11/0015; B41J 11/002; C09D 11/30; C09D 11/40; C09D 11/101; C09D 11/107; C09D 11/322; B41M 7/0081

USPC ....... 347/86, 95–100, 102; 106/31.13, 31.27, 106/31.6

See application file for complete search history.

(56) References Cited

U.S. PATENT DOCUMENTS

| | | | |
|---|---|---|---|
| 6,326,419 B1 | 12/2001 | Smith | |
| 6,627,677 B2 | 9/2003 | Smith | |
| 2002/0004539 A1 | 1/2002 | Smith | |
| 2008/0051484 A1* | 2/2008 | Sugai | C09D 11/101 522/74 |
| 2008/0076043 A1* | 3/2008 | Mori | G03F 7/0007 430/7 |
| 2009/0237479 A1* | 9/2009 | Yamashita | B41J 11/002 347/103 |

(Continued)

FOREIGN PATENT DOCUMENTS

| | | |
|---|---|---|
| JP | H08-218017 | 8/1996 |
| JP | 2001-512777 | 8/2001 |

(Continued)

OTHER PUBLICATIONS

Applications: Free Radical Initiator, p. 7.*

(Continued)

*Primary Examiner* — Matthew Luu
*Assistant Examiner* — Rut Patel
(74) *Attorney, Agent, or Firm* — Fildes & Outland, P.C.

(57) ABSTRACT

There is provided an ultraviolet-curable aqueous ink containing: a continuous phase containing water; and a dispersed phase dispersed in the continuous phase, wherein the dispersed phase contains a water-insoluble ultraviolet polymerizable compound, and a water-insoluble ultraviolet polymerization initiator having an absorption at a wavelength range of 375 nm or more and 450 nm or less.

5 Claims, 2 Drawing Sheets

(56) References Cited

U.S. PATENT DOCUMENTS

| | | | |
|---|---|---|---|
| 2010/0221507 A1* | 9/2010 | Morimoto | C09D 11/101 428/195.1 |
| 2011/0074897 A1* | 3/2011 | Araki | C09D 11/101 347/102 |
| 2012/0225968 A1 | 9/2012 | Nakano et al. | |

FOREIGN PATENT DOCUMENTS

| | | |
|---|---|---|
| JP | 2002-275403 | 9/2002 |
| JP | 2007-277380 | 10/2007 |
| JP | 2009-227762 | 10/2009 |
| JP | 2010-024297 | 2/2010 |
| JP | 2012-149228 | 8/2012 |

OTHER PUBLICATIONS

English language abstract and machine translation of JP H08-218017.

English language abstract and machine translation of JP 2009-227762.

English language abstract and machine translation of JP 2007-277380.

Office Action in corresponding Japanese Patent Application No. 2013-120861, dated Jul. 19, 2016, with an English language translation thereof.

English language abstract and machine translation of JP 2002-275403.

English language abstract and machine translation of JP 2010-024297.

* cited by examiner

ULTRAVIOLET-CURABLE AQUEOUS INK, INK CARTRIDGE, RECORDING APPARATUS AND RECORDING METHOD

CROSS-REFERENCE TO RELATED APPLICATIONS

This application is based on and claims priority under 35 USC 119 from Japanese Patent Application No. 2013-120861 filed on Jun. 7, 2013.

BACKGROUND

1. Field

The present invention relates to an ultraviolet (UV)-curable aqueous ink, an ink cartridge, a recording apparatus and a recording method.

2. Description of the Related Art

Japanese Patent Laid-Open No. H 08-218017 discloses "an ink containing a water-insoluble monomer to be solidified by energy application, a solvent (solvent containing IPA and NMP) for dissolving the water-insoluble monomer, water, a recording agent (coloring material), and a solidification initiator."

Japanese Patent Laid-Open No. 2009-227762 discloses "an ink for inkjet which contains a pigment, water, a permeable solvent, a wetting agent and a UV-curable resin emulsion."

Japanese Patent Laid-Open No. 2007-27738 discloses "an aqueous active energy ray curable ink that contains water, a water-soluble photo-polymerizable substance, a water-soluble acylphosphine oxide-based photopolymerization initiator, and an amine compound, in which the content of the amine compound is 0.1 wt % or more, and less than 0.5 wt %."

SUMMARY

[1] An ultraviolet-curable aqueous ink containing:
 a continuous phase containing water; and
 a dispersed phase dispersed in the continuous phase,
 wherein the dispersed phase contains a water-insoluble ultraviolet polymerizable compound, and a water-insoluble ultraviolet polymerization initiator having an absorption at a wavelength range of 375 nm or more and 450 nm or less.

DETAILED DESCRIPTION

Figure 1:
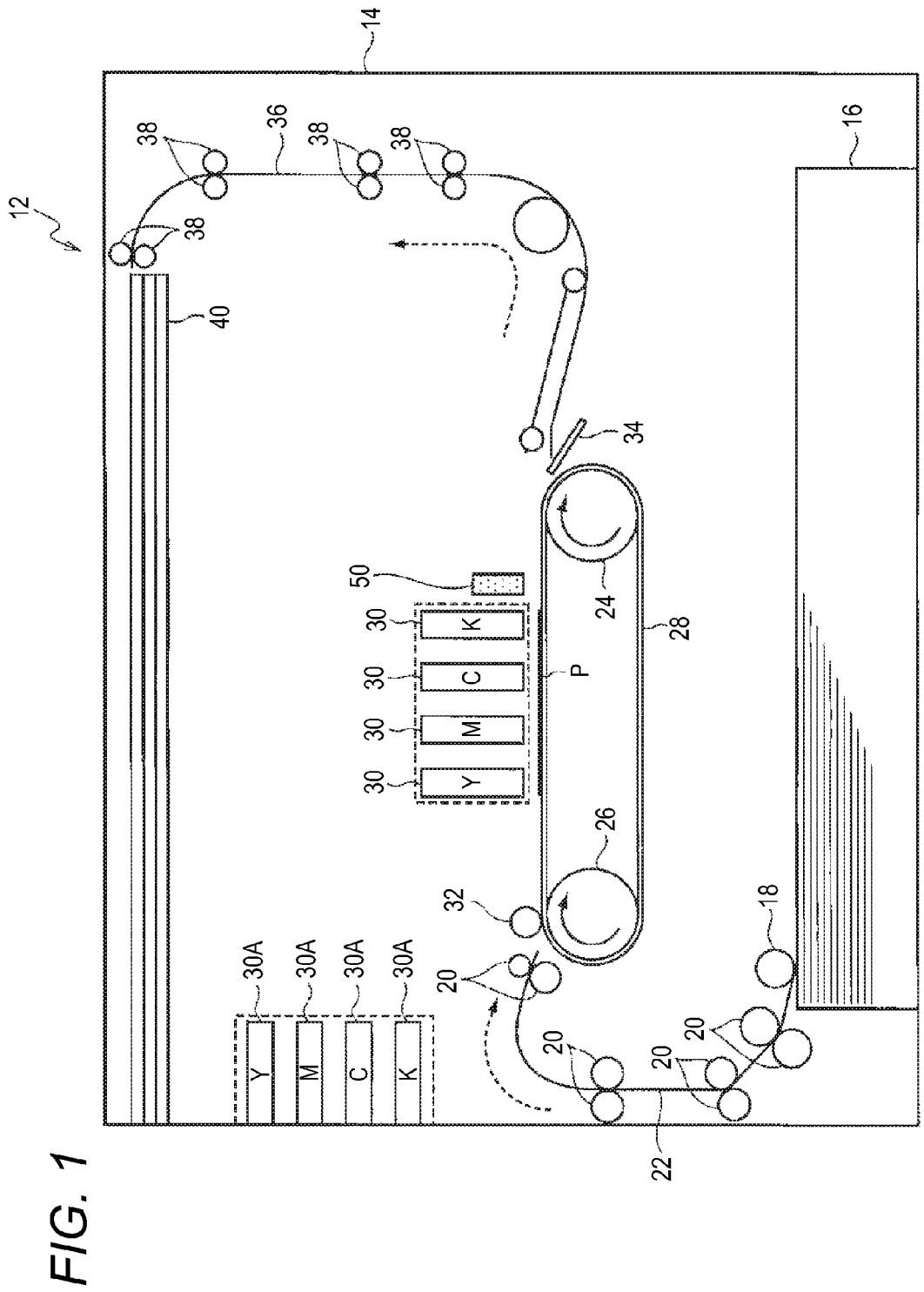
FIG. 1 is a schematic view illustrating an inkjet recording apparatus according to the present exemplary embodiment.

Hereinafter, an exemplary embodiment of the present invention will be described in detail.

[Ultraviolet-curable Aqueous Ink]

An ultraviolet-curable aqueous ink (hereinafter, referred to as "ink") according to the present exemplary embodiment has a continuous phase containing water, and a dispersed phase dispersed in the continuous phase, wherein the dispersed phase contains a water-insoluble ultraviolet polymerizable compound, and a water-insoluble ultraviolet polymerization initiator having an absorption at a wavelength range of 375 nm or more and 450 nm or less (that is, optical absorption resolution wavelength).

That is, in the ink according to the present exemplary embodiment, a dispersed phase is formed by dispersing the water-insoluble ultraviolet polymerizable compound and the water-insoluble ultraviolet polymerization initiator in an aqueous phase which is a continuous phase, the dispersed phase made from an oil phase containing the water-insoluble ultraviolet polymerizable compound and the water-insoluble ultraviolet polymerization initiator.

Here, it has been recently investigated that a recording apparatus using the ultraviolet curable ink is mounted with a light source [e.g., ultraviolet light emitting diode; hereinafter referred to as "UV-LED"] that irradiates UV rays at a wavelength range at a long wavelength side (a wavelength range of 375 nm or more and 450 nm or less) close to a visible range, the light source having a better energy efficiency than a conventional lamp, such as a mercury lamp or a metal halide lamp, that irradiates UV rays at a short wavelength side.

Meanwhile, it is known that an oil-based ink as an ultraviolet-curable ink is bad in smoothness on a recording surface (printing surface) by the ink because its volatility is low or its permeability into a recording medium is low. Thus, a requirement for using an aqueous ink that is good in volatility and permeability into a recording medium has been increased.

However, in the ultraviolet-curable aqueous ink, when a water-soluble ultraviolet polymerizable compound is applied, the water-resistance of an obtained image has a tendency to be lowered. Thus, from the standpoint of improving the water-resistance of the obtained image, a water-insoluble ultraviolet polymerizable compound is preferably applied.

Meanwhile, in the ultraviolet-curable aqueous ink, when the water-insoluble ultraviolet polymerizable compound is applied, the polymerization rate (curing rate) of the ultraviolet polymerizable compound has a tendency to be lowered. The reason for this is assumed that the ultraviolet polymerizable compound alone is emulsified and dispersed in water, and thus the function of the ultraviolet polymerization initiator is not exhibited.

When the polymerization rate (curing rate) of the ultraviolet polymerizable compound is low, an offset may occur regardless of sheet of paper or roll paper as a recording medium, thereby making it difficult for high speed recording to be achieved.

Therefore, in the ink according to the present exemplary embodiment, through the above described composition, an image excellent in water-resistance may be obtained, and at the same time, the occurrence of an offset (a phenomenon in which an ink is transferred to a member for winding the recording medium or transferred to an overlapped recording medium when the recording medium is overlapped) is suppressed even by irradiation of UV rays at a wavelength range (wavelength range of 375 nm or more and 450 nm or less) at a long wavelength side, thereby achieving high speed recording.

The reason for this is unclear, but is assumed that in order to achieve polymerization of the ultraviolet polymerizable compound by irradiation of UV rays at a wavelength range (wavelength range of 375 nm or more and 450 nm or less) at a long wavelength side, a water-insoluble ultraviolet polymerization initiator having an absorption at a wavelength range of 375 nm or more and 450 nm or less is contained as an ultraviolet polymerization initiator, together with the ultraviolet polymerizable compound, in a dispersed phase dispersed in an aqueous phase which is a continuous phase, and thus the ultraviolet polymerization initiator may be easily present around the ultraviolet polymerizable compound. For this reason, it is considered that the curing rate of the ultraviolet polymerizable compound by irradiation of UV rays is increased.

For this reason, it is considered that in the ink according to the present exemplary embodiment, an image excellent in water-resistance may be obtained, and at the same time, the occurrence of an offset is suppressed even by irradiation of UV rays at a wavelength range (wavelength range of 375 nm or more and 450 nm or less) at a long wavelength side, thereby achieving high speed recording.

In the ink according to the present exemplary embodiment, since a water-insoluble ultraviolet polymerization initiator together with a water-insoluble ultraviolet polymerizable compound is contained in a dispersed phase dispersed in an aqueous phase as a continuous phase, these materials are suppressed from being precipitated. For this reason, it is considered that the storage stability of the ink is easily increased. In addition to this, since the water-insoluble ultraviolet polymerizable compound and the water-insoluble ultraviolet polymerization initiator exist in a state where they are dissolved in an oil phase instead of an aqueous phase (that is, they may exist in an aqueous phase through a dispersant), it is thought that the hydrolysis rate of the polymerizable compound and the polymerization initiator is suppressed.

In the ink according to the present exemplary embodiment, the continuous phase made from the aqueous phase may contain a water-soluble photo-polymerizable compound. When the continuous phase made from the aqueous phase contains the water-soluble photo-polymerizable compound, an image with high intensity may be easily obtained.

In the ink according to the present exemplary embodiment, the dispersant for forming the dispersed phase in the continuous phase made from the aqueous phase is preferably a dispersant having a radical reactive group. When the dispersant having a radical reactive group is applied, an image with high intensity may be easily obtained.

Hereinafter, an ink according to the present exemplary embodiment will be described in detail.

The ink according to the present exemplary embodiment has a continuous phase made from an aqueous phase, and a dispersed phase made from an oil phase dispersed in a continuous phase.

The aqueous phase (continuous phase) contains water. The aqueous phase may contain, if necessary, a coloring agent, a water-soluble organic solvent, a water-soluble photo-polymerizable compound, and other additives.

The oil phase (dispersed phase) contains a water-insoluble ultraviolet polymerizable compound, and a water-insoluble ultraviolet polymerization initiator. The oil phase, if necessary, may contain a hydrogen donor agent (ultraviolet polymerization auxiliary initiator), and other additives.

The ink according to the present exemplary embodiment may contain a dispersant for forming a dispersed phase made from an oil phase. That is, in the ink according to the present exemplary embodiment, the dispersed phase made from the oil phase may be formed by the dispersant.

=Aqueous Phase (Continuous Phase)=
(Water)

As water, ion-exchanged water, ultrapure water, distilled water, or ultrafiltration water may be appropriately exemplified, especially, from the standpoint of suppressing impurities from being mixed, or microorganisms from being produced.

The content of water, for example, preferably ranges from 10 mass % to 95 mass % and more preferably, from 20 mass % to 90 mass %, based on ink.

(Coloring Agent)

As the coloring agent, a pigment may be exemplified. As the pigment, an organic pigment, or an inorganic pigment may be exemplified.

Specific examples of a black pigment may include Raven 7000, Raven 5750, Raven 5250, Raven 5000ULTRAIL Raven 3500, Raven 2000, Raven 1500, Raven 1250, Raven 1200, Raven 1190ULTRAII, Raven 1170, Raven 1255, Raven 1080, and Raven 1060 (all manufactured by Columbian Carbon Co., Ltd), Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (all manufactured by Cabot Corp.), Color Black FW1, Color Black FW2, Color Black FW2V, Color Black 18, Color Black FW200, Color Black 5150, Color Black S160, Color Black S170, Printex 35, Printex U, Printex V, Printex 140U, Printex 140V, Special Black 6, Special Black 5, Special Black 4A, and Special Black 4 (all manufactured by Degussa Co., Ltd.), No. 25, No. 33, No. 40, No. 47, No. 52, No. 900, No. 2300, MCF-88, MA600, MA7, MA8, and MA100 (all manufactured by Mitsubishi Chemical Corp), but the present invention is not limited thereto.

Specific examples of a cyan color pigment may include C.I. Pigment Blue −1, −2, −3, −15, −15:1, −15:2, −15:3, −15:4, −16, −22, and −60, but the present invention is not limited thereto.

Specific examples of a magenta color pigment may include C.I. Pigment Red −5, −7, −12, −48, −48:1, −57, −112, −122, −123, −146, −168, −177, −184, −202, and C.I. Pigment Violet−19, but the present invention is not limited thereto.

Specific examples of a yellow pigment may include C.I. Pigment Yellow −1, −2, −3, −12, −13, −14, −16, −17, −73, −74, −75, −83, −93, −95, −97, −98, −114, −128, −129, −138, −151, −154, and −180, but the present invention is not limited thereto.

When the pigment is used as the coloring agent, a pigment dispersant is preferably used together with the pigment. Examples of the pigment dispersant that may be used may include a polymer dispersant, an anionic surfactant, a cationic surfactant, an amphoteric surfactant, and a nonionic surfactant.

As the polymer dispersant, a polymer having a hydrophilic structure and a hydrophobic structure is appropriately used. As the polymer having the hydrophilic structure and the hydrophobic structure, a condensation polymer or an addition polymer may be used. Examples of the condensation polymer may include a conventionally known polyester-based dispersant. Examples of the addition polymer may include an addition polymer of monomers having an α, β-ethylenically unsaturated group. By copolymerizing a monomer having an α, β-ethylenically unsaturated group having a hydrophilic group and a monomer having an α, β-ethylenically unsaturated group having a hydrophobic group in combination, a required polymer dispersant may be obtained. Further, a homopolymer of monomers having an α, β-ethylenically unsaturated group having a hydrophilic group may be used.

Examples of the monomer having an α, β-ethylenically unsaturated group having a hydrophilic group may include monomers having a carboxyl group, a sulfonate group, a hydroxyl group, a phosphate group or the like, such as acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylamide, methacryloxy ethyl phosphate, bis-methacryloxy ethyl phosphate, methacryloxy ethyl phenyl acid phosphate, ethylene glycol dimethacrylate, and diethylene glycol dimethacrylate.

Examples of the monomer having an α, β-ethylenically unsaturated group having a hydrophobic group may include styrene derivatives such as styrene, α-methylstyrene and vinyl toluene, vinyl cyclohexane, vinyl naphthalene, vinyl naphthalene derivatives, alkyl acrylate ester, alkyl methacrylate ester, phenyl methacrylate ester, cycloalkyl methacrylate ester, alkyl crotonate ester, dialkyl itaconate ester, dialkyl maleate ester and the like.

Preferable examples of the copolymer as the polymer dispersant may include styrene-styrene sulfonic acid copolymer, styrene-maleic acid copolymer, styrene-methacrylic acid copolymer, styrene-acrylic acid copolymer, vinylnaphthalene-maleic acid copolymer, vinyl naphthalene-methacrylic acid copolymer, vinylnaphthalene-acrylic acid copolymer, alkyl acrylate ester-acrylic acid copolymer, alkyl methacrylate ester-methacrylic acid copolymer, styrene-alkyl methacrylate ester-methacrylic acid copolymer, styrene-alkyl acrylate ester-acrylic acid copolymer, styrene-phenyl methacrylate ester-methacrylic acid copolymer, and styrene-cyclohexyl methacrylate ester-methacrylic acid copolymer. Further, these polymers may be copolymerized with a monomer having a polyoxyethylene group, or a hydroxyl group.

The weight-average molecular weight of the polymer dispersant may range from 2,000 to 50,000.

These polymer dispersants may be used alone or in combination of two or more kinds thereof. The content of the polymer dispersant cannot be unconditionally determined because it largely varies according to the pigment. However, the content may range from 0.1 mass % to 100 mass % based on the pigment.

As the pigment, a self-dispersible pigment in water (hereinafter, referred to as a self-dispersion type pigment) may be also exemplified.

The self-dispersion type pigment refers to a pigment having water-solubilizing groups on the pigment surface, which can be dispersed in water even without the polymer dispersant. The self-dispersion type pigment, for example, is obtained by carrying out surface modification treatments, such as an acid/base treatment, a coupling agent treatment, a polymer graft treatment, a plasma treatment, an oxidation/reduction treatment, on a pigment.

Examples of the self-dispersion type pigment may include, in addition to the above described surface modified pigment, commercially available self dispersion pigments such as Cab-o-jet-200, Cab-o-jet-300, Cab-o-jet-400, IJX-157, IJX-253, IJX-266, IJX-273, IJX-444, IJX-55, Cab-o-jet-250C, Cab-o-jet-260M, Cab-o-jet-270Y, Cab-o-jet-450C, Cab-o-jet-465M, Cab-o-jet-470Y, and Cab-o-jet-480M manufactured by Cabot Corp., and Microjet Black CW1, and CW-2 manufactured by Orient Chemical Co., Ltd.

As the self-dispersion type pigment, a pigment at least having sulfonic acid, sulfonate, carboxylic acid, or carboxylate as a functional group on the surface thereof is preferable. Further, a pigment at least having carboxylic acid or carboxylate as a functional group on the surface thereof is more preferable.

Here, as the pigment, a pigment coated with a resin may be exemplified. This is called a micro capsule pigment, such as commercially available micro capsule pigments manufactured by DIC Corporation, or Toyo Ink Co., Ltd. The present invention is not limited to the commercially available microcapsule pigments. Microcapsule pigments prepared depending on their purposes may be used.

As the pigment, a resin-dispersion type pigment having a polymer compound physically adsorbed or chemically bonded to the pigment may also be exemplified.

As the pigment, other than a black pigment and three primary color pigments of cyan, magenta, and yellow, specific color pigments such as red, green, blue, brown, and white, metallic luster pigments such as gold and silver, colorless or light-colored extender pigments, and plastic pigments may also be exemplified.

As the pigment, particles obtained by fixing a dye or a pigment onto the surface of silica, alumina, or polymer beads as a core, an insoluble lake product of a dye, a colored emulsion, and a colored latex may also be exemplified.

As the coloring agent, other than the pigment, dyes such as a hydrophilic anionic dye, a direct dye, a cationic dye, a reactive dye, a polymer dye and an oil soluble dye, wax•resin powders or emulsions colored by a dye, a fluorescent dye or a fluorescent pigment may be exemplified.

The volume average particle size of the coloring agent may range, for example, from 10 nm to 1,000 nm.

The volume average particle size of the coloring agent refers to a particle size of a coloring agent itself, or a particle size of a coloring agent adhered with an additive when the additive such as a dispersant is adhered to the coloring agent. The measurement of the volume average particle size is performed by MICROTRAC UPA particle size analyzer 9340 (manufactured by Leeds & Northrup Corp.) as a measuring device. The measurement was carried out with 4 ml of ink placed in a measuring cell. As input values at the time of the measurement, the viscosity of the ink was input as the viscosity, and the density of the coloring agent was input as the density of dispersion particles.

The content (concentration) of the coloring agent may preferably range from 0.5 mass % to 15 mass % and more preferably from 1 mass % to 10 mass % based on the ink.
(Water-Soluble Organic Solvent)

As the water-soluble organic solvent, polyhydric alcohols, polyhydric alcohol derivatives, a nitrogen-containing solvent, alcohols, and a sulfur-containing solvent may be exemplified. As the water-soluble organic solvent, propylene carbonate, ethylene and carbonate may be further exemplified. In the water-soluble organic solvent, "water-soluble" means that an object material is dissolved in an amount of 1 part by mass or more based on 100 parts by mass of water at 25° C.

Examples of the polyhydric alcohols may include sugar alcohols such as ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol; and saccharides such as xylose, glucose, and galactose.

Examples of the polyhydric alcohol derivatives may include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adduct of diglycerin.

Examples of the nitrogen-containing solvent may include pyrrolidone, N-methyl-2-pyrrolidone, cyclohexylpyrrolidone, and triethanolamine.

Examples of the alcohols may include ethanol, isopropyl alcohol, butyl alcohol, and benzyl alcohol.

Examples of the sulfur-containing solvent may include thiodiethanol, thiodiglycerol, sulfolane, and dimethylsulfoxide.

The water-soluble organic solvent may be used either alone or in combination of two or more kinds thereof.

The content of the water-soluble organic solvent preferably ranges from 1 mass % to 60 mass %, and more preferably from 1 mass % to 40 mass %, based on water.

(Water-Soluble Ultraviolet Polymerizable Compound)

As the water-soluble ultraviolet polymerizable compound, a conventionally known photo-polymerizable compound may be exemplified, and specific examples thereof may include radical polymerizable monomers such as acryloyl morpholine (ACMO), hydroxyethyl acrylamide (HEAA), diacetone acrylamide, N-vinyl-2-pyrrolidone, N-vinyl-formamide, vinyl naphthalene sulfonic acid, hydroxyethyl(meth)acrylate, methoxypolyethylene glycolmethacrylate, methoxy polyethylene glycolacrylate, ester of succinic anhydride and 2-hydroxyethyl(meth)acrylate, and ester of orthophthalic anhydride and 2-hydroxyethyl(meth)acrylate.

As the water-soluble ultraviolet polymerizable monomer, a radical polymerizable monomer such as (meth)acrylate ester of polyhydric alcohol, and (meth)acrylate ester of glycidyl ether derived from polyhydric alcohol may also be exemplified.

As the water-soluble ultraviolet polymerizable compound, an oligomer obtained by polymerizing water-soluble photo-polymerizable monomers to a required degree of polymerization may also be exemplified.

The content of the water-soluble ultraviolet polymerizable compound is preferably 80 mass % or less based on the total of ultraviolet polymerizable compound from the viewpoint of suppressing the reduction of water-resistance of an image, and more preferably ranges from 20 mass % to 70 mass % and further more preferably from 30 mass % to 70 mass %, based on the total of ultraviolet polymerizable compound from the viewpoint of intensity and water-resistance of an image.

(Other Additives)

As the other additives that may be contained in the aqueous phase, conventionally known additives, such as an ink ejection property improving agent (e.g., polyethylenimine, polyamines, polyvinylpyrrolidone, polyethylene glycol, ethyl cellulose, and carboxymethyl cellulose), a conductivity/pH adjuster (e.g., alkaline metal compounds such as potassium hydroxide, sodium hydroxide, and lithium hydroxide), a reactive dilution solvent, a penetrant, a pH buffer, an antioxidant, a fungicide, a viscosity modifier, a conductive agent, a chelating agent, a UV absorbent, and an infrared absorbent may be exemplified.

=Oil Phase (Dispersed Phase)=

(Water-Insoluble Ultraviolet Polymerizable Compound)

As the ultraviolet polymerizable compound, a water-insoluble ultraviolet polymerizable compound is employed. In the ultraviolet polymerizable compound, "water-soluble" means that an object material is dissolved in an amount of 5 parts by mass or more (preferably, 10 parts by mass or more) based on 100 parts by mass of water at 25° C. Meanwhile, "water-insoluble" means that an object material is dissolved in an amount of less than 5 parts by mass based on 100 parts by mass of water at 25° C.

The water-insoluble ultraviolet polymerizable compound may be exemplified with a compound having a polymerizable group that is radically polymerized by UV rays, and may be a monomer, an oligomer, or a mixture thereof. As the polymerizable group, a group having an ethylenically unsaturated double bond may be exemplified, and specific examples thereof may include an acryloyl group, a methacryloyl group, a vinyl group, a vinyl ether group, an epoxy group, an oxetane group, a maleic anhydride group, and an N-substituted maleimide group.

As the water-insoluble ultraviolet polymerizable compound, conventionally known water-insoluble ultraviolet polymerizable substances may be exemplified, and specific examples of the water-insoluble ultraviolet polymerizable substance may include radical polymerizable monomers such as alcohols, acrylate esters of polyhydric alcohols or amino alcohols; methacrylate esters of alcohols or polyhydric alcohols; acrylic aliphatic amides; acrylic alicyclic amides; and acrylic aromatic amides.

As the water-insoluble ultraviolet polymerizable compound, oligomers obtained by polymerizing water-insoluble ultraviolet polymerizable monomers to a required degree of polymerization; and acrylate oligomers having an acryloyl group or a methacryloyl group on an epoxy skeleton, an urethane skeleton, a polyester skeleton or a polyether skeleton (e.g., epoxy acrylate, urethane acrylate, polyester acrylate, polyether acrylate, urethane methacrylate, and polyester methacrylate); may also be exemplified.

The water-insoluble ultraviolet polymerizable compound may be used either alone or in combination of two or more kinds thereof.

The content (concentration) of the water-insoluble ultraviolet polymerizable compound may preferably range from 5 mass % to 50 mass %, more preferably from 10 mass % to 40 mass %, and further more preferably from 15 mass % to 30 mass %, based on the ink.

(Water-Insoluble Ultraviolet Polymerization Initiator)

As the ultraviolet polymerization initiator, a water-insoluble ultraviolet polymerization initiator is employed. In the ultraviolet polymerizable initiator, "water-soluble" means that an object material is dissolved in an amount of 0.1 parts by mass or more based on 100 parts by mass of water at 25° C. Meanwhile, "water-insoluble" means that an object material is dissolved in an amount of less than 0.1 parts by mass based on 100 parts by mass of water at 25° C.

As the ultraviolet polymerization initiator, an ultraviolet polymerization initiator having an absorption at the wavelength range of 375 nm or more and 450 nm or less is employed. That is, as the ultraviolet polymerization initiator, an ultraviolet polymerization initiator that generates radicals by irradiation of UV rays at the wavelength range of 375 nm or more and 450 nm or less is employed.

As the water-insoluble ultraviolet polymerization initiator, a thioxanthone compound, and an acylphosphine oxide compound may be exemplified.

The thioxanthone compound may be exemplified with a thioxanthone compound represented by the following Formula (TK).

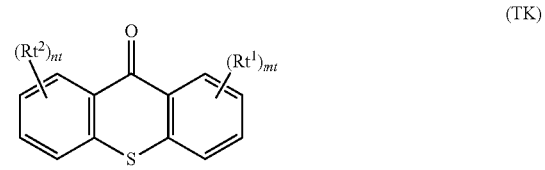

In Formula (TK), $Rt^1$ and $Rt^2$ each independently represent a halogen atom, a substituted or unsubstituted alkyl group, a substituted or unsubstituted alkylether group, or a group wherein these groups are bonded to an ester group. mt and nt each independently represent 0, or an integer from 1 to 3.

When mt represents an integer of 2 or more, a plurality of $Rt^1$'s may be the same or different from every other $Rt^1$'s. Likewise, when nt represents an integer of 2 or more, a plurality of $Rt^2$'s may be the same or different from every other $Rt^2$'s.

In Formula (TK), examples of the halogen atom represented by $Rt^1$ and $Rt^2$ may include a fluorine atom, a chlorine atom, and a bromine atom.

The alkyl group represented by $Rt^1$ and $Rt^2$ may be any one of a linear group and a branched group, and, for example, may be an alkyl group having 1 to 10 carbon atoms (preferably 1 to 5 carbon atoms, and more preferably 1 to 3 carbon atoms). Examples of the linear alkyl group may include a methyl group, an ethyl group, an n-propyl group, an n-butyl group, an n-pentyl group, an n-hexyl group, an n-octyl group, and an n-nonyl group. Examples of the branched alkyl group may include an isopropyl group, an isobutyl group, a sec-butyl group, a tert-butyl group, an isohexyl group, and a 2-ethylhexyl group.

The alkylether group represented by $Rt^1$ and $Rt^2$ may be any one of a linear group and a branched group, and for example, may be an alkoxy group having 1 to 10 carbon atoms (preferably 1 to 5 carbon atoms, and more preferably 1 to 3 carbon atoms). Examples of the linear alkoxy group may include a methoxy group, an ethoxy group, an n-propoxy group, and an n-butoxy group. Examples of the branched alkoxy group may include an isopropoxy group, an isobutoxy group, a sec-butoxy group, a tert-butoxy group, and a 2-ethylhexyloxy group.

As a substituent by which the alkyl group or alkylether group represented by $Rt^1$ and $Rt^2$ may be substituted, a hydroxyl group, an amino group, an alkoxy group, an amide group, a carbonyl group, and a halogen atom and the like may be exemplified.

As the thioxanthone compound represented by Formula (TK), a compound in which $Rt^1$ represents an alkyl group, mt represents 0, or an integer from 1 to 2, and nt represents 0 is suitable.

Specific examples of the thioxanthone compound may include isopropyl thioxanthone, diethyl thioxanthone, chlorothioxanthone, dimethyl thioxanthone, methylethyl xanthone, and methyl isopropyl xanthone.

The acylphosphine oxide compound may be exemplified with an acylphosphine oxide compound represented by the following Formula (AP).

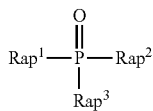

(AP)

In Formula (AP), $Rap^1$, $Rap^2$, and $Rap^3$ each independently represent a substituted or unsubstituted alkoxy group, a substituted or unsubstituted phenyl group, a substituted or unsubstituted benzoyl group, or a group wherein these groups are bonded to an ester group.

In Formula (AP), the alkoxy group represented by $Rap^1$, $Rap^2$, and $Rap^3$ may have any one of an linear alkyl moiety and a branched alkyl moiety, and may be an alkoxy group having an alkyl moiety having 1 to 10 carbon atoms (preferably 1 to 8 carbon atoms, and more preferably 1 to 5 carbon atoms). Examples of the linear alkoxy group may include a methoxy group, an ethoxy group, an n-propoxy group, an n-butoxy group, an n-pentyloxy group, and an n-octyloxy group. Examples of the branched alkoxy group may include an isopropoxy group, an isobutoxy group, a sec-butoxy group, and a tert-butoxy group.

As a substituent by which the alkoxy group represented by $Rap^1$, $Rap^2$, and $Rap^3$ may be substituted, a halogen atom, a hydroxyl group, an amino group, an alkoxy group, an amide group, and a carbonyl group may be exemplified.

As a substituent by which the phenyl group represented by $Rap^1$, $Rap^2$, and $Rap^3$ may be substituted, a halogen atom, an alkyl group, a hydroxyl group, an amino group, an alkoxy group, an amide group, and a carbonyl group may be exemplified.

As a substituent by which the benzoyl group represented by $Rap^1$, $Rap^2$, and $Rap^3$ may be substituted, a halogen atom, an alkyl group, an alkoxy group, a hydroxyl group, an amino group, an alkoxy group, an amide group, and a carbonyl group may be exemplified.

Specific examples of the acylphosphine oxide compound may include bis(2,4,6-trimethylbenzoyl)-phenylphosphineoxide, bis(2,6-dimethoxybenzoyl)-2,4,4-trimethylpentyl-phosphineoxide, 2,4,6-trimethylbenzoylphenylethoxyphosphineoxide, 2,4,6-trimethylbenzoyl diphenylphosphineoxide, and ethylphenyl(2,4,6-[trimethylbenzoyl phosphinate.

The water-insoluble ultraviolet polymerization initiator may be used in combination with other ultraviolet polymerization initiators, if necessary. However, it is preferable that the other ultraviolet polymerization initiators are used in an amount of 20 mass % or less based on the total of the ultraviolet polymerization initiator.

As other ultraviolet polymerization initiators, conventionally known water-insoluble ultraviolet polymerization initiators such as a benzoin compound (e.g., benzoin ethylether, benzoin isopropyl ether), and a benzophenone, anthraquinone compound (e.g., ethyl anthraquinone) may be exemplified.

The water-insoluble ultraviolet polymerization initiator may be used either alone or in combination of two or more kinds thereof.

The content of the water-insoluble ultraviolet polymerization initiator preferably ranges from 0.1 mass % to 20 mass %, more preferably from 0.1 mass % to 10 mass %, and further more preferably from 1 mass % to 10 mass %, based on the ink.

(Hydrogen Donor Agent (Ultraviolet Polymerization Auxiliary Initiator))

As the hydrogen donor agent (ultraviolet polymerization auxiliary initiator), a water-insoluble hydrogen donor agent is employed. In the hydrogen donor agent, "water-soluble" means that an object material is dissolved in an amount of 0.01 parts by mass or more based on 100 parts by mass of water at 25° C. Meanwhile, "water-insoluble" means that an object material is dissolved in an amount of less than 0.01 parts by mass based on 100 parts by mass of water at 25° C.

As the water-insoluble hydrogen donor agent, a water-insoluble tertiary amine compound may be exemplified. As the water-insoluble tertiary amine compound, amine containing an aromatic group may be exemplified, and specifically, an amine compound containing a benzoic acid skeleton (e.g., a tertiary amine compound represented by the following Formula (AM)) may be exemplified.

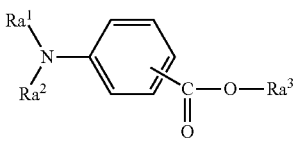

(AM)

In Formula (AM), $Ra^1$ and $Ra^2$ each independently represent a substituted or unsubstituted alkyl group, or a group wherein a substituted or unsubstituted alkyl group is bonded to an ester group. $Ra^1$ and $Ra^2$ may be linked to each other to form an unsubstituted or substituted alicyclic structure or a multi-membered ring structure containing a heteroatom. $Ra^3$ represents a substituted or unsubstituted alkyl group, or a group wherein a substituted or unsubstituted alkyl group is bonded to an ester group.

In Formula (AM), the alkyl group represented by $Ra^1$ and $Ra^2$ may be any one of a linear group and a branched group, and, for example, may be an alkyl group having 1 to 10 carbon atoms (preferably 1 to 7 carbon atoms, and more preferably 1 to 4 carbon atoms). Examples of the linear alkyl group may include a methyl group, an ethyl group, an n-propyl group, an n-butyl group, an n-pentyl group, an n-hexyl group, an n-octyl group, and an n-nonyl group. Examples of the branched alkyl group may include an isopropyl group, an isobutyl group, a sec-butyl group, a tert-butyl group, an isohexyl group, and a 2-ethylhexyl group.

As the alicyclic structure or the multi-membered ring structure containing a heteroatom, which is formed by linking $Ra^1$ and $Ra^2$ to each other, a form containing the N atom represented in Formula (AM), such as a piperidinyl group, a piperazinyl group, and a morpholino group may be exemplified.

As a substituent by which the alkyl group or the multi-membered ring structure represented by $Ra^1$ and $Ra^2$ may be substituted, a hydroxyl group, an amino group, an alkoxy group, an amide group, a carbonyl group, and a halogen atom may be exemplified.

In Formula (AM), the alkyl group represented by $Ra^3$ may be any one of a linear group and a branched group, and, for example, may be an alkyl group having 1 to 10 carbon atoms (preferably 1 to 8 carbon atoms, and more preferably 1 to 5 carbon atoms). Examples of the linear alkyl group may include a methyl group, an ethyl group, an n-propyl group, an n-butyl group, an n-pentyl group, an n-hexyl group, an n-octyl group, and an n-nonyl group. Examples of the branched alkyl group may include an isopropyl group, an isobutyl group, a sec-butyl group, a tert-butyl group, an isohexyl group, and a 2-ethylhexyl group.

As a substituent by which the alkyl group represented by $Ra^3$ may be substituted, a hydroxyl group, an amino group, an alkoxy group, an amide group, a carbonyl group, and a halogen atom may be exemplified.

Specific examples of the tertiary amine compound represented by Formula (AM) may include 2-dimethylamino ethyl benzoate, 4-dimethylamino ethyl benzoate, 4-dimethylamino isoamyl benzoate, 4-dimethylamino methyl benzoate, 4-dimethylamino 3-methylbutyl benzoate, 4-dimethylamino 2-ethylhexyl benzoate, p-piperidinyl methyl benzoate, p-piperidinyl ethyl benzoate, p-piperazinyl methyl benzoate, p-piperazinyl ethyl benzoate, p-morpholino methyl benzoate, p-morpholino ethyl benzoate, 4-diethylamino methyl benzoate, 4-diethylamino 3-methylbutyl benzoate, 2-diethylamino ethyl benzoate, 4-diethylamino ethyl benzoate, and 4-diethylamino isoamyl benzoate.

As the water-insoluble tertiary amine compound, other than the tertiary amine compound represented by Formula (AM), tripropylamine, tributylamine, dimethylphenyl piperazine, 1-(2-ethoxyphenylpiperazine, and 1-(2,6-dimethoxyphenyl) piperazine may be exemplified.

As the water-insoluble hydrogen donor agent (ultraviolet polymerization auxiliary initiator), other than the water-insoluble tertiary amine compound, amine-containing compounds such as aliphatic amine, amine (piperidine) containing an aromatic group, and triethanolamine; urea-containing compounds such as allylurea, and o-tolylthiourea; sulfur-containing compounds such as sodium diethyldithiophosphate, and a soluble salt of aromatic sulfinic acid; a nitrile-containing compound such as N, N, di-substituted p amino benzonitrile; phosphorous-containing compounds such as tri-n-butylphosphine, sodium diethyl dithiophosphate; nitrogen-containing compounds such as Michler's ketone, N-nitrosohydroxyl amine derivatives, oxazolidine compounds, tetrahydro-1,3-oxazin compounds, and condensates of aldehyde (formaldehyde or acetaldehyde) and diamine; a polymerized amine constituted by a reaction product of an epoxy resin and amine; and triethanolamine triacrylate may be exemplified.

The water-insoluble hydrogen donor agent may be used either alone or in combination of two or more kinds thereof.

The content of the water-insoluble hydrogen donor agent may preferably range from 0.01 mass % to 20 mass %, more preferably from 0.01 mass % to 10 mass %, and further more preferably from 0.1 mass % to 10 mass %, based on the ink.
(Other Additives)

As the other additives that may be contained in the oil phase, conventionally known additives, such as a sensitizer, and a chain transfer agent may be exemplified.
=Dispersant=

As the dispersant for forming the dispersed phase made from the oil phase in the continuous phase made from the aqueous phase, conventionally known dispersants may be exemplified.

Specifically, as the dispersant, various kinds of surfactants (e.g., an anionic surfactant, and a nonionic surfactant), and polymer dispersants which have been described as the pigment dispersant may be exemplified. As the dispersant, a dispersant having a radical reactive group (hereinafter, also referred to as "reactive dispersant") may be further exemplified.

As the dispersant, a polymer dispersant is preferable in consideration of a steric effect (specifically, an increase of a layer thickness around the oil phase).

As the anionic surfactant, alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate may be exemplified.

Among them, as the anionic surfactant, dodecylbenzenesulfonate, isopropylnaphthalenesulfonate, monobutylphenylphenol monosulfonate, monobutylbiphenyl sulfonate, monobutylbiphenylsulfonate, and dibutylphenylphenol disulfonate may be preferable.

As the nonionic surfactant, polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkylamine, polyoxyethylene fatty acid amide, alkylalkanolamide, polyethylene glycolpoly propylene glycol block copolymer, acetylene glycol, and a polyoxyethylene adduct of acetylene glycol may be exemplified.

Among them, as the nonionic surfactant, polyoxyethylenenonyl phenylether, polyoxyethyleneoctyl phenylether, polyoxyethylenedodecyl phenylether, polyoxyethylene alkylether, polyoxyethylene fatty acid ester, sorbitan fatty acid ester, polyoxyethylene sorbitan fatty acid ester, fatty acid alkyloamide, polyethylene glycolpoly propylene glycol block copolymer, acetylene glycol, and a polyoxyethylene adduct of acetylene glycol may be preferable.

As the nonionic surfactant, silicon surfactants such as a polysiloxane oxyethylene adduct; fluorine surfactants such as perfluoroalkylcarboxylate, perfluoroalkyl sulfonate, and oxyethyleneperfluoro alkylether; and biosurfactants such as spiculisporic acid, rhamnolipid, and lysolecithin; may be further exemplified.

The hydrophilic/hydrophobic balance (HLB) of the nonionic surfactant may range from 10 to 18 (preferably, from 12 to 18) in consideration of solubility or the like.

The HLB (hydrophilic group/hydrophobic group balance "Hydrophile-Lipophile Balance") is defined by following equation (Griffin's method).

$$HLB=20\times(\text{sum of the molecular mass of a hydrophilic unit}/MW)$$

As the reactive dispersant, a dispersant having a radical reactive group that is radically polymerized by UV rays [a group having an ethylenically unsaturated double bond (e.g., an acryloyl group, a methacryloyl group, a vinyl group, a vinyl ether group, an epoxy group, an oxetane group, a maleic anhydride group, and a N-substituted maleimide group)] may be exemplified.

Specifically, as the reactive dispersant, conventionally known reactive dispersants such as a compound having vinyl ether at an ester end group of styrene-(meth) acrylic acid-(meth)acrylate ester, and (meth)acrylate containing a silicon chain and an oxyethylene group (e.g., "TEGO 2200N (e.g., a silicon-based surfactant modified by polyoxyalkylene made from polyethylene oxide/poly propylene oxide having three acryloyl groups: HLB=10: manufactured by Degussa Co., Ltd.)" may be exemplified.

The dispersant may be used either alone or in combination of two or more kinds thereof.

The content of the dispersant preferably ranges from 0.1 mass % to 10 mass %, more preferably from 0.1 mass % to 5 mass % and further more preferably from 0.2 mass % to 3 mass %, based on the ink.

(Physical Properties of Ink)

The surface tension of the ink according to the present exemplary embodiment may range from 20 mN/m to 45 mN/m.

As the surface tension, a value measured through a wilhelmy type surface tensiometer (manufactured by Kyowa Interface Science Co., Ltd) under a condition of 23° C. and 55% RH was employed.

The viscosity of the ink according to the present exemplary embodiment may range from 1.5 mPa·s to 30 mPa·s. As the viscosity, a value measured through Reomatto 115 (manufactured by Contraves Co.,) as a measuring device under a condition of a measurement temperature of 23° C., and a shear rate of 1400 s$^{-1}$ was employed.

[Recording Apparatus/Recording Method]

The recording apparatus according to the present exemplary embodiment is provided with an ejecting device configured to eject the ink (ultraviolet-curable aqueous ink) according to the present exemplary embodiment, and an ultraviolet irradiation device configured to irradiate UV rays at a wavelength range of 375 nm or more and 450 nm or less to the ejected ink.

In the recording apparatus according to the present exemplary embodiment, a recording method is performed, the method including ejecting the ink (ultraviolet-curable aqueous ink) according to the present exemplary embodiment, and irradiating UV rays at a wavelength range of 375 nm or more and 450 nm or less to the ejected ink.

The recording apparatus according to the present exemplary embodiment may be provided with an ink cartridge which contains the ink (ultraviolet-curable aqueous ink) according to the present exemplary embodiment, and is made as a cartridge form to be detachable from the recording apparatus.

Hereinafter, the recording apparatus according to the present exemplary embodiment will be described with reference to drawings.

Figure 2:
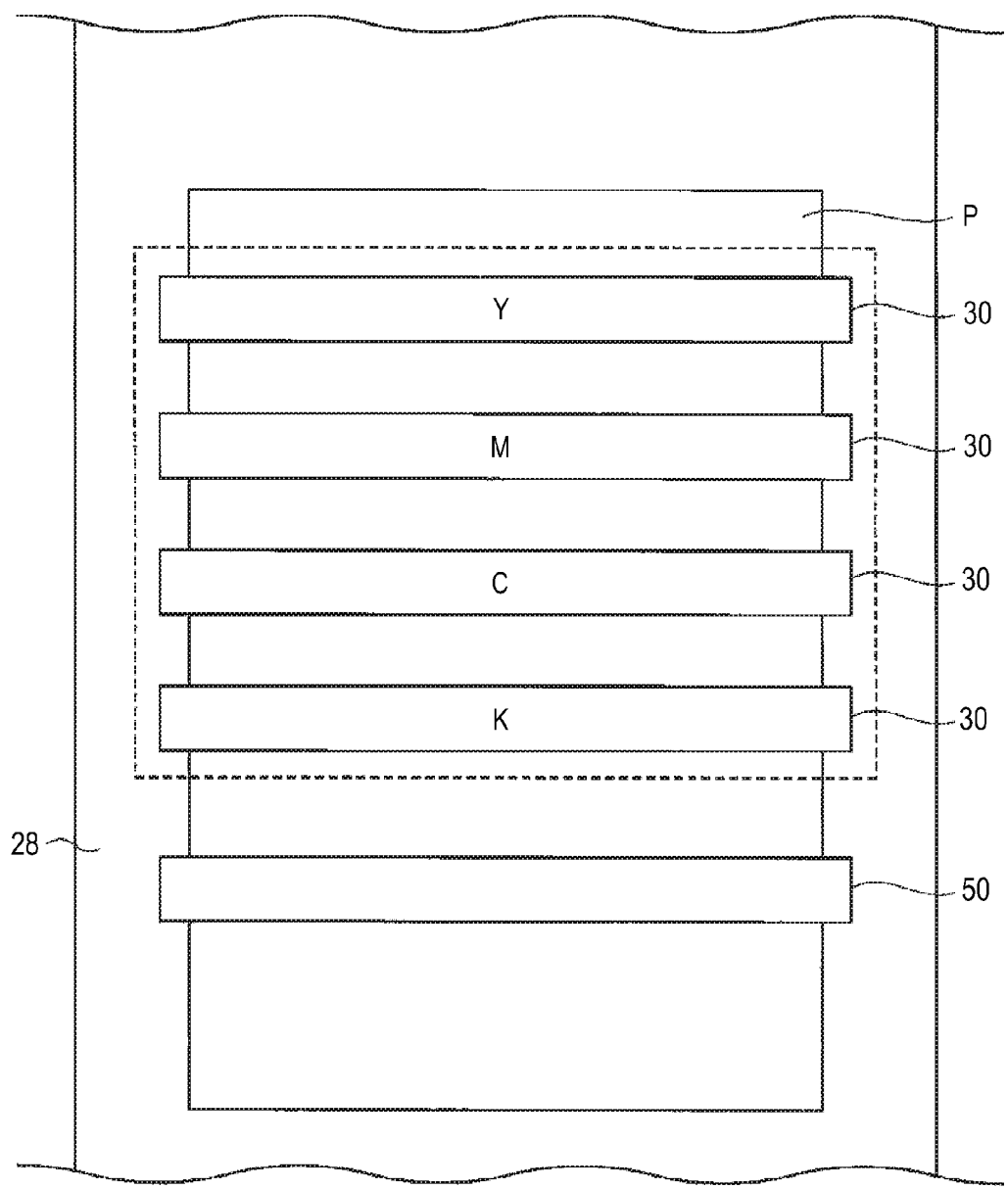
FIG. 2 is a partial plan view illustrating the circumference of a recording head in the inkjet recording apparatus according to the present exemplary embodiment.

FIG. 1 is a schematic view illustrating an inkjet recording apparatus according to the present exemplary embodiment. FIG. 2 is a partial plan view illustrating the circumference of a recording head in the inkjet recording apparatus according to the present exemplary embodiment.

An inkjet recording apparatus 12 according to the present exemplary embodiment, for example, as illustrated in FIGS. 1 and 2, is provided with a paper feeding container 16 at a lower side within a case 14, and a mechanism configured to take out papers P (an example of a recording medium) layered within the paper feeding container 16, one by one by a take-out roll 18. The paper P which has been taken out is conveyed by a plurality of pairs of carrying-in rollers 20 which constitute a carrying-in path 22.

An endless conveyor belt 28 that is held by being tensioned by a driving roll 24 and a driven roll 26 is disposed above the paper feeding container 16. A recording head 30 (an example of the ejecting device) is disposed above the conveyor belt 28, which faces a flat portion of the conveyor belt 28. The area where the recording head 30 faces the flat portion of the conveyor belt 28 is set as an ejection area at which ink droplets are ejected from the recording head 30 to the paper P. The paper P conveyed by the pairs of carrying-in roller 20 reaches the ejection area by being supported by the conveyor belt 28, and is placed to face the recording head 30, and then droplets of the ink ejected from the recording head 30 according to image information are adhered on the surface of the paper P.

The recording head 30 of each color is connected to an ink cartridge 30A of each color that is detachable from the inkjet recording apparatus 12 via a supply tube (not illustrated), and an ink of each color is supplied to the recording head 30 by the ink cartridge 30A.

The recording head 30, for example, as illustrated in FIG. 2, is an elongated recording head that has an effective recording area (a disposition area of a nozzle configured to eject the ink) not less than the width of the paper P (the length in a direction crossing (e.g., perpendicular to) the conveyance direction of the paper P).

The recording head 30 is not limited thereto, and may employ another recording head that is shorter than the width of the paper P, and ejects the ink by moving in the width direction of the paper P (so-called carriage type).

The recording head 30 may employ conventional types such as a so-called thermal type in which ink droplets are ejected by heat, or a so-called piezoelectric type in which ink droplets are ejected by a pressure.

As the recording heads 30, four recording heads which correspond to four colors, respectively, for example, yellow (Y), magenta (M), cyan (C), and black (K) are disposed in an array according to a conveyance direction. It is natural that the recording heads 30 are not limited to the form where the four recording heads 30 corresponding to the four colors, respectively are disposed, and depending on purposes, one recording head 30 corresponding to black (K) may be disposed, or four or more recording heads 30 corresponding to respective four or more colors additionally containing another neutral color may be disposed.

A charging roll 32 is disposed at the upstream side (the conveyance direction upstream side of the paper P) of the recording head 30. The charging roll 32 is driven while the conveyor belt 28 and the paper P are interposed between the charging roll 32 and the driven roll 26, and thereby a potential difference is applied between the charging roll 32 and the grounded driven roll 26, and an electric charge is applied to the paper P so as to electrostatically adsorb the paper P on the conveyor belt 28.

An ultraviolet irradiation device 50 is disposed at the downstream side of the recording head 30 (the conveyance direction downstream side of the paper P) above the conveyor belt 28.

The ultraviolet irradiation device 50 irradiates UV rays on the ink adhered on the paper P on the conveyor belt 28.

The ultraviolet irradiation device 50, for example, as illustrated in FIG. 2, is an elongated ultraviolet irradiation device that has an effective UV irradiation area (a disposition area of a light source configured to irradiate ultraviolet rays) not less than the width of an area capable of being recorded by the recording head 30 (in a direction crossing (e.g., perpendicular to) the conveyance direction of the paper P).

The ultraviolet irradiation device 50 is not limited thereto, and may employ another ultraviolet irradiation device that is shorter than the width of the area capable of being recorded by the recording head 30, and irradiates UV rays by moving in the width direction of the area that is recorded by the recording head 30 (so-called carriage type).

As the light source of the ultraviolet irradiation device 50, a light source with a good energy efficiency that irradiates UV rays at a wavelength range at a long wavelength side (a wavelength range of 375 nm or more and 450 nm or less) close to a visible range may be employed. Specifically, a light emitting diode (LED), a semiconductor laser (LD, VCSEL), and a laser wavelength converting light source may be exemplified.

Among them, as the light source of the ultraviolet irradiation device 50, an ultraviolet light emitting diode (UV-LED) is preferable.

A releasing plate 34 is disposed at the downstream side of the ultraviolet irradiation device 50 (the conveyance direction downstream side of the paper P), which is configured to release the paper P from the conveyor belt 28. The released paper P is conveyed from the downstream side of the releasing plate 34 (the conveyance direction downstream side of the paper P) by a plurality of pairs of discharge rollers 38 constituting a discharge path 36, and is discharged to a paper discharge tray 40 provided above the case 14.

Hereinafter, an operation of the recording apparatus 12 according to the present exemplary embodiment will be described.

In the recording apparatus 12 according to the present exemplary embodiment, the paper P is taken out from the paper feeding container 16, one by one by the take-out roll 18, and is conveyed to the conveyor belt 28 via the carrying-in path 22.

Then, the paper P is electrostatically adsorbed on the conveyor belt 28 by the charging roll 32, and conveyed to a position below the recording head 30 by rotation of the conveyor belt 28.

Then, the ink is ejected by the recording head 30 to record a required image on the paper P.

Then, on the ink adhered on the paper P, UV rays are irradiated by the ultraviolet irradiation device 50, by which a curing reaction (polymerization) of the ultraviolet polymerizable compounds in the ink is performed. Thus, the ink (the image by the ink) is cured and fixed on the paper P.

The ultraviolet irradiation conditions of the ultraviolet irradiation device 50 vary according to the kinds of the ultraviolet polymerizable compound contained in the ink, but may be preferably conditions by which the ultraviolet polymerizable compounds in the ink ejected on the paper P are cured through a curing reaction (polymerization).

Specifically, the ultraviolet irradiation conditions may include a wavelength range (center wavelength) from 375 nm to 450 nm, an irradiation intensity from 10 mW/cm$^2$ to 5000 mW/cm$^2$ (preferably, from 50 mW/cm$^2$ to 500 mW/cm$^2$), and an irradiation time from 0.1 milliseconds to 10 seconds (preferably, from 10 milliseconds to 100 milliseconds).

Then, the paper P on which the ink (the image formed by the ink) is fixed (formed) is discharged to the paper discharge tray 40 via the discharge path 36.

In this manner, in the recording apparatus 12 according to the present exemplary embodiment, the paper P on which the ink (the image formed by the ink) is fixed (formed) may be obtained.

As described above, in the recording apparatus 12 according to the present exemplary embodiment, ink droplets are directly ejected on the surface of the paper P by the recording head 30, but the present invention is not limited thereto. For example, ink droplets may be ejected on an intermediate transfer body, and then the ink droplets on the intermediate transfer body may be transferred on the paper P.

As described above, in the recording apparatus 12 according to the present exemplary embodiment, the ink (the image formed by the ink) is fixed (formed) on a sheet of paper as the paper P. Meanwhile, the ink (the image formed by the ink) may be fixed (formed) on a roll paper as the paper P by using a continuous feed printer.

It is natural that the present exemplary embodiment is not construed in a limited way, and may be made within a range satisfying requirements of the present invention.

EXAMPLE

Hereinafter, the present invention will be described in more detail by examples, but is not particularly limited by these examples.

Example 1

| | |
|---|---|
| Glycerin propoxy triacrylate: (water-insoluble ultraviolet polymerizable compound: manufactured by Daicel Cytec Co., Ltd.) | 40 parts by mass |

| | |
|---|---|
| Cyan pigment aqueous dispersion liquid: (manufactured by CABOT Corp.: pigment concentration 10 mass %) | 30 parts by mass |
| Glycerin: | 5 parts by mass |
| Polyoxyethylene sorbitan monostearate: (dispersant: manufactured by Kao Corporation) | 4 parts by mass |
| Kayacure DETX-S: (water-insoluble UV polymerization initiator: thioxanthone compound: 2,4-diethylthioxanthone: manufactured by Nippon Kayaku Co., Ltd.) | 1.5 parts by mass |
| Kayacure EPA: (water-insoluble tertiary amine compound: 4-dimethylamino ethyl benzoate: manufactured by Nippon Kayaku Co., Ltd.) | 1 part by mass |
| Pure water: | 20 parts by mass |

In the above composition, glycerin propoxy triacrylate, Kayacure DETX-S and Kayacure EPA are mixed to obtain a mixture liquid. The mixture liquid is added in an aqueous solution having polyoxyethylene sorbitan monostearate dissolved therein, and is subjected to ultrasonic homogenizer irradiation to obtain a dispersion liquid.

The obtained dispersion liquid is added with other materials, mixed with each other, and filtered with a filter of 5 μm to obtain an ultraviolet-curable aqueous ink of a cyan color.

Kayacure DETX-S(2,4-diethylthioxanthone: UV polymerization initiator) has an absorption peak at 385 nm.

Example 2

| | |
|---|---|
| Pentaerythritol ethoxytetraacrylate: (water-insoluble ultraviolet polymerization initiator: manufactured by Shin-Nakamura Chemical Co., Ltd.) | 25 parts by mass |
| Magenta pigment aqueous dispersion liquid: (manufactured by CABOT Corp.: pigment concentration 10 parts by mass) | 20 parts by mass |
| Diethylene glycol: | 5 parts by mass |
| Butyl acrylate-sodium acrylate copolymer (dispersant): | 3 parts by mass |
| 2,4,6-Trimethylbenzoylphenyl ethyl phosphate: (water-insoluble UV polymerization initiator: acylphosphine oxide compound: 2,4,6-trimethylbenzoylphenylethoxyphosphineoxide: manufactured by Construction Chemical Co., Ltd.) | 1.5 parts by mass |
| Pure water: | 40 parts by mass |

In the above composition, pentaerythritol ethoxy tetraacrylate and 2,4,6-trimethylbenzoylphenyl ethyl phosphate are mixed to obtain a mixture liquid. The mixture liquid is added in an aqueous solution having butyl acrylate-sodium acrylate copolymer dissolved therein, and is subjected to ultrasonic homogenizer irradiation to obtain a dispersion liquid.

The obtained dispersion liquid is added with other materials, mixed with each other, and filtered with a filter of 5 μm to obtain an ultraviolet-curable aqueous ink of a magenta color.

2,4,6-trimethylbenzoylphenylethyl phosphate (ultraviolet polymerization initiator) has an absorption peak around 375 nm.

Example 3

| | |
|---|---|
| Pentaerythritol tetraacrylate: (water-insoluble ultraviolet polymerizable compound: manufactured by Shin-Nakamura Chemical Co., Ltd.) | 25 parts by mass |
| Polyethylene glycol #400 diacrylate: (water-soluble ultraviolet polymerizable compound: manufactured by KYOEISHA CHEMICAL Co., Ltd.) | 15 parts by mass |
| Yellow pigment aqueous dispersion liquid: (manufactured by CABOT Corp.: pigment concentration 10 mass %) | 20 parts by mass |
| Glycerin: | 5 parts by mass |
| polyoxyethylene stearyl ether (dispersant): | 4 parts by mass |
| 2,4,6-Trimethylbenzoylphenylethyl phosphate: (water-insoluble ultraviolet polymerization initiator: acylphosphine oxide compound: 2,4,6-trimethylbenzoylphenylethoxyphosphineoxide: manufactured by Construction Chemical Co., Ltd.) | 1.5 parts by mass |
| Pure water: | 40 parts by mass |

In the above composition, pentaerythritol ethoxy tetraacrylate and 2,4,6-trimethylbenzoylphenylethyl phosphate are mixed to obtain a mixture liquid. The mixture liquid is added in an aqueous solution having polyoxyethylene stearylether therein, and is subjected to ultrasonic homogenizer irradiation to obtain a dispersion liquid.

The obtained dispersion liquid is added with other materials, mixed with each other, and filtered with a filter of 5 μm to obtain an ultraviolet-curable aqueous ink of a yellow color.

2,4,6-Trimethylbenzoylphenylethyl phosphate (ultraviolet polymerization initiator) has an absorption around 375 nm.

Example 4

| | |
|---|---|
| Urethaneacrylate having an isocyanuric ring: (water-insoluble ultraviolet polymerizable compound: "Aronix M-313 (manufactured by Toa Gosei Co., Ltd.)") | 30 parts by mass |
| Black pigment aqueous dispersion liquid: (manufactured by CABOT Corp.: pigment concentration 10 mass %) | 20 parts by mass |
| Triethylene glycol: | 5 parts by mass |
| 2-Ethylhexyloxyacrylate-sodium acrylate copolymer: (a reactive dispersant having an acrylate group at an ester end) | 3 parts by mass |
| Kayacure DETX-S: (water-insoluble ultraviolet polymerization initiator: thioxanthone compound: 2,4-diethylthioxanthone: manufactured by Nippon Kayaku Co., Ltd.) | 1.0 part by mass |
| Kayacure EPA: (water-insoluble tertiary amine compound: 4-dimethylamino ethyl benzoate: manufactured by Nippon Kayaku Co., Ltd.) | 0.6 parts by mass |
| Pure water: | 40 parts by mass |

In the above composition, urethaneacrylate having an isocyanuric ring, Kayacure DETX-S and Kayacure EPA are mixed to obtain a mixture liquid. The mixture liquid is added in an aqueous solution having 2-ethylhexyloxyacrylate-sodium acrylate copolymer therein, and is subjected to ultrasonic homogenizer irradiation to obtain a dispersion liquid.

The obtained dispersion liquid is added with other materials, mixed with each other, and filtered with a filter of 5 μm to obtain an ultraviolet-curable aqueous ink of a black color.

Kayacure DETX-S has an absorption peak around 385 nm.

Example 5

| | |
|---|---|
| Pentaerythritol tetraacrylate: | 30 parts by mass |
| (water-insoluble ultraviolet polymerizable compound: manufactured by Shin-Nakamura Chemical Co., Ltd.) | |
| Cyan pigment aqueous dispersion liquid: | 20 parts by mass |
| (manufactured by CABOT Corp.: pigment concentration 10 mass %) | |
| Glycerin: | 7 parts by mass |
| TEGO 2200N: | 4 parts by mass |
| (silicon-containing polyoxyethyleneacrylate: reactive dispersant: manufactured by Degussa Co., Ltd.) | |
| Bis(2,4,6-trimethylbenzoyl)-phenylphosphineoxide: | 2.0 parts by mass |
| (water-insoluble ultraviolet polymerization initiator: acylphosphine oxide compound: manufactured by BASF Corporation) | |
| Pure water: | 30 parts by mass |

In the above composition, pentaerythritol tetraacrylate and bis(2,4,6-trimethylbenzoyl)-phenylphosphineoxide are mixed to obtain a mixture liquid. The mixture liquid is added in an aqueous solution having TEGO 2200N therein, and is subjected to ultrasonic homogenizer irradiation to obtain a dispersion liquid.

The obtained dispersion liquid is added with other materials, mixed with each other, and filtered with a filter of 5 μm to obtain an ultraviolet-curable aqueous ink of a cyan color.

Bis(2,4,6-trimethylbenzoyl)-phenylphosphineoxide (UV polymerization initiator) has an absorption around 370 nm.

Example 6

| | |
|---|---|
| Trimethylol propaneethoxy triacrylate: | 25 parts by mass |
| (water-insoluble ultraviolet polymerizable compound: manufactured by Shin-Nakamura Chemical Co., Ltd.) | |
| Polyethylene glycol #600 diacrylate: | 15 parts by mass |
| (water-soluble ultraviolet polymerizable compound: manufactured by KYOEISHA CHEMICAL Co., Ltd.) | |
| Black pigment aqueous dispersion liquid: | 20 parts by mass |
| (manufactured by CABOT Corp.: pigment concentration 10 mass %) | |
| Glycerin: | 4 parts by mass |
| Polyoxyethylene sorbitan monooleate: | 4 parts by mass |
| (dispersant: manufactured by Kao Corporation) | |
| Bis(2,4,6-trimethylbenzoyl)-phenylphosphineoxide: | 1.5 parts by mass |
| (water-insoluble ultraviolet polymerization initiator: acylphosphine oxide compound: manufactured by BASF Corporation) | |
| Water-soluble acylphosphine oxide: | 1.5 parts by mass |
| (water-soluble ultraviolet polymerization initiator: in which an alkyl group substituted with carboxylic acid is introduced into an aromatic ring in an acylphosphine oxide structure) | |
| Pure water: | 30 parts by mass |

In the above composition, trimethylol propaneethoxy triacrylate and bis(2,4,6-trimethylbenzoyl)-phenylphosphineoxide are mixed to obtain a mixture liquid. The mixture liquid is added in an aqueous solution having polyoxyethylene sorbitan monooleate therein, and is subjected to ultrasonic homogenizer irradiation to obtain a dispersion liquid.

The obtained dispersion liquid is added with other materials, mixed with each other, and filtered with a filter of 5 μm to obtain an ultraviolet-curable aqueous ink of a cyan color.

Bis(2,4,6-trimethylbenzoyl)-phenylphosphineoxide (ultraviolet polymerization initiator) has an absorption around 370 nm.

Water-soluble acylphosphine oxide (ultraviolet polymerization initiator) has an absorption peak around 375 nm.

Comparative Example 1

| | |
|---|---|
| Urethaneacrylate oligomer aqueous emulsion: | 50 parts by mass |
| (water-insoluble ultraviolet polymerizable compound content 40 mass %: manufactured by Arakawa Chemical Industries, Ltd.) | |
| Cyan pigment aqueous dispersion liquid: | 25 parts by mass |
| (manufactured by CABOT Corp.: pigment concentration 10 mass %) | |
| Glycerin: | 10 parts by mass |
| Triethylene glycolmonobutylether: | 4 parts by mass |
| Surfynol 465 (manufactured by Nissin Chemical Industry Co., Ltd.): | 1 part by mass |
| IRGACURE 2959: | 2 parts by mass |
| (water-soluble ultraviolet polymerization initiator: manufactured by BASF Corporation) | |
| Pure water: | 10 parts by mass |

The materials of the above composition are mixed with each other, and filtered with a filter of 5 μm to obtain an ultraviolet-curable aqueous ink of a cyan color.

IRGACURE 2959 (ultraviolet polymerization initiator) is water-soluble and has an absorption peak around 320 nm.

Comparative Example 2

| | |
|---|---|
| Polyethylene glycol #600 diacrylate: | 35 parts by mass |
| (water-soluble ultraviolet polymerizable compound: manufactured by KYOEISHA CHEMICAL Co., Ltd.) | |
| Magenta pigment aqueous dispersion liquid: | 20 parts by mass |
| (manufactured by CABOT Corp.: pigment concentration 10 mass %) | |
| Glycerin: | 10 parts by mass |
| Water-soluble acylphosphine oxide: | 1.5 parts by mass |
| (water-soluble ultraviolet polymerization initiator: in which an alkyl group substituted with carboxylic acid is introduced into an aromatic ring in an acylphosphine oxide structure) | |
| Pure water: | 10 parts by mass |

The materials of the above composition are mixed with each other, and filtered with a filter of 5 μm to obtain an ultraviolet-curable aqueous ink of a magenta color.

The water-soluble acylphosphine oxide (ultraviolet polymerization initiator) has an absorption peak around 375 nm.

[Evaluation]

Following evaluations are performed on the ultraviolet curable water-soluble ink obtained from each of examples. The evaluation results are noted in Table 1.

—Water-Resistance Evaluation—

The ultraviolet-curable aqueous ink obtained from each of examples is coated on an OHP (overhead projector) sheet with a film thickness of about 18 μm by a slit coater, and the coated film is sufficiently cured by a UV oven (a light source: a UV-LED lamp with an emission wavelength of 395 nm). Water is dropped on the cured film, and then the cured film after wiping off water drops is evaluated. Evaluation criteria are as follows.

G1: No disturbance of cured film

G2: Ink is adhered on the cloth that has been used for wiping-off, and disturbance of cured film is present.

—Offset Evaluation—

By a continuous feed printer, the ultraviolet-curable water-soluble ink obtained from each of examples is continuously printed on a roll paper that is conveyed at a conveyance rate of 20 mm/s to form an line-shaped image, and is irradiated with UV rays by a UV-LED lamp having an emission wavelength of 395 nm under a condition of cumulative amount of 10 J/cm$^2$. Then, the roll paper is wound and taken out. After the roll paper is left in a roll winding state, the offset level at the printing reverse side is evaluated. Evaluation criteria are as follows.

G1: No Offset
G2: Slight offset
G3: Significant offset

—Ink Storage Stability Evaluation—

The ultraviolet curable water-soluble ink obtained from each of examples is stored at 40° C. for one month, and the offset evaluation is performed. Evaluation criteria are as follows.

G1: No change in offset evaluation result between immediately after ink preparation, and after ink storage
G2: Offset evaluation result is degraded after ink storage as compared to that immediately after ink preparation —Image Intensity Evaluation—

The ultraviolet curable water-soluble ink obtained from each of examples is coated on an OHP sheet with a film thickness of about 18 μm by a slit coater, and the coated film is irradiated with UV rays by a UV-LED lamp with an emission wavelength of 395 nm under a condition of cumulative amount of 10 J/cm$^2$. Then, an image portion is rubbed with a non-printed art paper at a load of about 100 kg/m$^2$, and the peeled state of the image is evaluated. Evaluation criteria are as follows.

G1: No peeling of image was observed.
G2: Slight image adhesion was seen at art paper side, but image disorder was not observed.
G3: Image disorder was observed.

TABLE 1

| | Water-resistance evaluation | Offset evaluation | Ink storage stability evaluation | Image intensity evaluation |
|---|---|---|---|---|
| Example 1 | G1 | G1 | G1 | G2 |
| Example 2 | G1 | G1 | G1 | G2 |
| Example 3 | G1 | G1 | G1 | G2 |
| Example 4 | G1 | G1 | G1 | G1 |
| Example 5 | G1 | G1 | G1 | G1 |
| Example 6 | G1 | G1 | G1 | G1 |
| Comp. Example 1 | G1 | G3 | G1 | G3 |
| Comp. Example 2 | G2 | G1 | G2 | G2 |

From the results, it can be understood that the present examples can achieve better results in water-resistance evaluation, offset evaluation, ink storage stability evaluation, image intensity evaluation than comparative examples.

What is claimed is:

1. An ultraviolet-curable aqueous ink comprising:
   a continuous phase containing water; and
   a dispersed phase dispersed in the continuous phase,
   wherein the dispersed phase contains a water-insoluble ultraviolet polymerizable compound, and a water-insoluble ultraviolet polymerization initiator having an absorption at a wavelength range of from 375 nm to 450 nm, and
   the continuous phase contains a water-soluble ultraviolet polymerizable compound.

2. The ultraviolet-curable aqueous ink according to claim 1, further comprising a dispersant that forms the dispersed phase in the continuous phase,
   wherein the dispersant is a dispersant having a radical reactive group.

3. An ink cartridge containing the ultraviolet-curable aqueous ink according to claim 1.

4. A recording apparatus comprising:
   an ejecting device that ejects the ultraviolet-curable aqueous ink according to claim 1; and
   an ultraviolet irradiation device that irradiates UV rays at a wavelength range of from 375 nm to 450 nm to the ejected ultraviolet-curable aqueous ink.

5. A recording method comprising:
   ejecting the ultraviolet-curable aqueous ink according to claim 1; and
   irradiating UV rays at a wavelength range of from 375 nm to 450 nm to the ejected ultraviolet-curable aqueous ink.

* * * * *